Nov. 25, 1947.   N. J. IVERSON   2,431,400
VEHICLE MOUNTED CARRIER BRACKET
Filed July 22, 1946
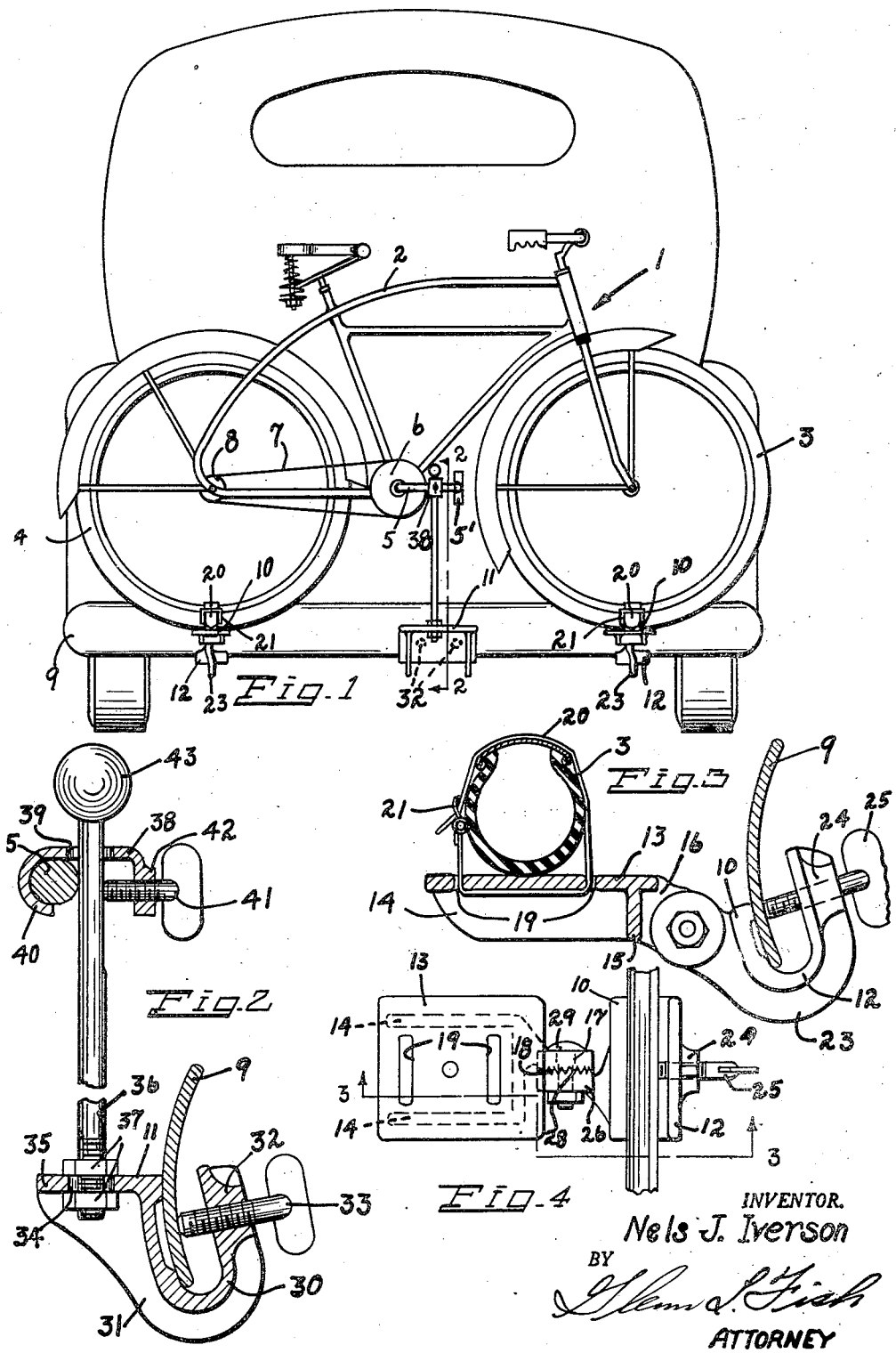
INVENTOR.
Nels J. Iverson
BY
ATTORNEY Patented Nov. 25, 1947

2,431,400

UNITED STATES PATENT OFFICE 2,431,400

VEHICLE MOUNTED CARRIER BRACKET

Nels J. Iverson, Veradale, Wash.

Application July 22, 1946, Serial No. 685,492

6 Claims. (Cl. 224—29)

This invention relates to brackets for securing a bicycle across an automobile in position to be supported by the bumper, the clamps being so formed that the bicycle may be supported along either the rear bumper or the front bumper. It will be understood that while the brackets are particularly adapted for holding a bicycle they may be used for securing other articles such as outboard motors, luggage carriers, and the like.

Another object of the invention is to provide clamps so formed that they may be easily applied to a bumper and project from the bumper in such position that the wheels and crank arm of a bicycle may be firmly secured to the clamps and thus hold the bicycle in an upright position transversely across the back or front of the automobile.

Another object of the invention is to provide clamps capable of being adjusted and accommodate themselves to the size of the bicycle to be secured.

Another object of the invention is to provide clamps which are of simple construction and easy to apply to a bumper and to portions of a bicycle.

The invention is illustrated in the accompanying drawings wherein:

Fig. 1 is a view in elevation showing a bicycle mounted back of an automobile by means of the improved clamps.

Fig. 2 is a fragmentary sectional view taken along line 2—2 of Figure 1.

Fig. 3 is a sectional view taken vertically through a wheel-engaging clamp, the view being along line 3—3 of Figure 4.

Fig. 4 is a top plan view of the wheel-engaging clamp.

The bicycle indicated in general by the numeral 1 is of conventional construction and has the usual frame 2, front and rear wheels 3 and 4, and crank arms 5 carrying pedals 5 by means of which the crank arms are moved to rotate the sprocket wheel 6 and transmit rotary motion to the rear wheel through the medium of the chain 7 and sprocket 8. When a person is travelling by automobile and desires to take a bicycle with him it is customary to place the bicycle across the front or back of the automobile with its wheels resting upon and secured to the bumper 9 by wire, rope, or other means devised by the occupant of the automobile, and the bicycle must then be secured in some manner in order to prevent it from tilting away from the automobile out of an upright position. This is inconvenient and often causes the surface of the automobile to be scratched.

The clamps or securing devices constituting the subject matter of this invention are manufactured as a set and consist of wheel engaging clamps 10 and a clamp 11 for engaging one of the crank arms 5. The clamps 10 are of duplicate construction and each consists briefly of a bracket 12 and a platform 13. The bracket has a flat upper surface upon which the bicycle wheel rests and is reinforced by depending webs 14 connected by a transversely extending web 15, and the web 15 carries a shank 16 terminating in a head 17 having its inner side face formed with clutch-teeth 18. Slots 19 are formed through the platform transversely thereof to receive a strap 20 which is passed about the rim of a wheel resting upon the platform and secured by its buckle 21 after being tightened to firmly secure the wheel upon the platform. An opening 22 is formed through the platform in order that when articles other than a bicycle are to be mounted upon the bumper 9 suitable clamps may be applied to the platforms of the clamps or fasteners 10.

The mounting brackets 12 of the fasteners 10 are each formed as shown in Figures 3 and 4 and each is U-shaped and reinforced by a depending web 23. The web is located midway the width of the bracket and adjacent the top of the outer arm of the bracket the web is intersected by a boss 24 formed with a threaded opening through which passes a thumb screw 25 for engaging the inner surface of the bumper 9 and causing the bumper to be gripped and the bracket firmly secured to the bumper when the thumb screw is tightened. At its outer end the web 23 is formed with a head 26 disposed in side by side relation to the head 17 and having its inner side face formed with clutch-teeth 28 companion to the teeth 18. A bolt 29 passes through the heads 17 and 26 and when this bolt is tightened the platform will be secured in an angularly adjusted position and prevented from tilting out of the adjusted position by the weight of the bicycle or other article supported upon the platform of the two fasteners.

The intermediate fastener 11 also has a clamp or bracket 30 which is U-shaped for straddling the bumper 9. This bracket is reinforced by depending webs 31 and between the webs the inner arm of the clamp is formed with bosses 32 having threaded openings to receive thumb screws 33 for engaging the inner surface of the bumper and causing the clamp or bracket to be firmly secured to the bumper. An opening 34 is formed through the platform 35 of the clamp to receive the threaded lower portion of the rod or standard 36, and the threaded lower portion of the standard carries nuts 37 for gripping upper and lower surfaces of the platform and firmly securing the standard in a vertical position. A metal clamp 38 fits about the standard and is formed with an opening 39 of such diameter that the clamp may be readily slid vertically along the standard to a position enabling the bill of jaw 40 of the clamp to be engaged about the crank arm 5 of the bicycle. A thumb screw 41 passing through a threaded opening formed through a boss 42 carried by the inner arm of the clamp is then tightened and firmly holds the clamp in an adjusted position upon the standard and when this thumb screw is tightened the crank arm will be firmly gripped between the jaw 40 and the standard and the bicycle will be prevented from tilting out of an upright position when subjected to jolts while the automobile is in motion. A ball 43 at the upper end of the standard prevents the clamp 28 from slipping off the upper end of the standard. The fact that the fasteners 10 and 11 may be shifted along the bumper 9 to adjusted positions and the clamp 38 shifted along the standard 36 to adjusted positions allows the fasteners to be used for securing bicycles of various sizes upon the bumper at the back or front of an automobile. The fasteners may be used as a set or individually according to the article to be secured and may be sold individually, if so desired, instead of as a set.

Having thus described the invention, what is claimed is:

1. Means for mounting a bicycle across an automobile above a bumper thereof comprising wheel engaging fasteners and a crank arm engaging fastener, said fasteners each having a clamp adapted to be secured in straddling engagement with a bumper and a platform carried by the clamp and projecting outwardly therefrom, straps carried by the platforms of the wheel-engaging fasteners and slidable through the same into position for engaging about the rims and tires of bicycle wheels, and vertically adjustable means carried by the platform of the crank arm engaging fastener for engaging a pedal-carrying crank arm of a bicycle.

2. Means for mounting a bicycle across an automobile above a bumper thereof comprising wheel engaging fasteners and a crank arm engaging fastener, said fasteners each having a clamp adapted to be secured in straddling engagement with a bumper and a platform projecting outwardly from an arm of the clamp, straps carried by the platforms of the wheel-engaging fasteners for engaging about the rims and tires of bicycle wheels, a standard carried by and extending upwardly from the platform of the crank arm engaging fastener, and a clamp shiftable along the standard into position for engaging about a pedal-carrying crank arm of a bicycle and adapted to be secured in an adjusted position upon the standard.

3. Means for mounting a bicycle across an automobile above a bumper thereof including a wheel engaging fastener comprising a U-shaped clamp for straddling a bumper, a screw threaded through the inner arm of said clamp for engaging the inner face of a bumper and securing the clamp to the bumper, a reinforcing rib extending along arms of the clamp and across the bridge thereof and having its outer end portion formed with a head having its inner side face formed with clutch teeth, a platform reinforced by depending ribs and having a head projecting from its inner end and disposed in side by side relation to the head of the clamp and formed upon its inner side face with clutch teeth, a bolt passed through the heads to pivotally mount the platform for vertical tilting to an adjusted position and when tightened holding the heads together and their teeth interengaged to secure the platform in an adjusted position, openings being formed in the platform, and a strap passing through the opening and having a buckle at one end whereby the strap may be passed about a rim and tire of a bicycle wheel and secure the wheel upon the platform.

4. Means for mounting a bicycle across an automobile above a bumper thereof including a wheel engaging fastener comprising a U-shaped clamp for straddling a bumper, a screw threaded through one arm of said clamp for engaging the confronting face of a bumper and securing the clamp to the bumper, a head carried by the clamp, a platform, a head projecting from the platform in side by side relation to the head of the clamp, a bolt passing through the heads to pivotally mount the platform for vertical tilting adjustment and when tightened holding the platform in an adjusted position, and a member carried by the platform for engaging about the rim and tire of a bicycle wheel and securing the wheel upon the platform.

5. Means for securing a bicycle across an automobile above a bumper thereof including a crank arm engaging fastener comprising a clamp having means for securing it to a bumper, a platform projecting outwardly from the clamp and formed with an opening, a vertical standard having its lower end threaded and passing through the opening, nuts carried by the threaded end of said standard and engaging upper and lower faces of the standard, a plate formed with an opening through which the standard passes and having its outer end portion bent downwardly and forming a curved lip for engaging about a pedal-carrying crank arm, the inner end portion of the plate being bent downwardly and formed with a boss through which a threaded opening is formed, a thumb screw mounted through the threaded opening for abutting the standard and releasably securing the plate in a vertically adjusted position upon the standard and causing the said crank arm to be gripped between the lip and the standard, and a confronting side portion of a head at the upper end of the standard.

6. Means for securing a bicycle across an automobile above a bumper thereof including a crank arm engaging fastener comprising a clamp having means for securing it to a bumper, a platform projecting outwardly from the clamp, a standard carried by said platform and projecting upwardly therefrom, and a plate shiftable vertically along the standard to adjusted positions and formed at one end with a lip for engaging about a crank arm and at its opposite end with a flange through which a set screw passes for abutting the standard and releasably securing the plate in an adjusted position upon the standard and causing a crank arm to be gripped between the lip and a confronting side portion of the standard.

NELS J. IVERSON.

REFERENCES CITED

The following references are of record in the file of this patent:

UNITED STATES PATENTS

| Number | Name | Date |
|---|---|---|
| 1,509,037 | Franklin | Sept. 16, 1924 |
| 2,087,217 | Cohen | July 13, 1937 |
| 2,409,395 | Schwinn | Oct. 15, 1946 |
| 2,415,286 | Hyde | Feb. 4, 1937 |

FOREIGN PATENTS

| Number | Country | Date |
|---|---|---|
| 93,243 | Sweden | Nov. 11, 1938 |
| 102,010 | Sweden | July 8, 1941 |